United States Patent [19]
Hill et al.

[11] Patent Number: 6,079,369
[45] Date of Patent: Jun. 27, 2000

[54] LEASH ATTACHMENT FOR A TRUCKBED

[76] Inventors: William Dean Hill; Brenda Hill, both of RR#3 Box 51 Site 2, Ponoka, Alberta, Canada, T4J-1R3

[21] Appl. No.: 08/878,805

[22] Filed: Jun. 19, 1997

[51] Int. Cl.[7] .................................................. A01K 15/04
[52] U.S. Cl. .............................................................. 119/771
[58] Field of Search ..................... 119/771, 769, 119/784; 410/145, 146, 151

[56] References Cited

U.S. PATENT DOCUMENTS

| | | | |
|---|---|---|---|
| 40,625 | 11/1863 | Jerome | 119/784 |
| 225,404 | 3/1880 | Maxey | 119/784 |
| D. 360,711 | 7/1995 | O'Neill | 119/771 X |
| 3,189,003 | 6/1965 | Canfield . | |
| 4,656,967 | 4/1987 | Duksa | 119/784 X |
| 4,667,625 | 5/1987 | Malone . | |
| 4,676,198 | 6/1987 | Murray . | |
| 4,715,618 | 12/1987 | Harris . | |
| 4,791,886 | 12/1988 | Anderson | 119/784 X |
| 4,827,876 | 5/1989 | Krekelberg . | |
| 4,834,027 | 5/1989 | Meyer | 119/784 X |
| 4,899,694 | 2/1990 | Belluomini . | |
| 4,947,801 | 8/1990 | Glass | 119/784 X |
| 4,958,597 | 9/1990 | Mildner . | |
| 5,497,732 | 3/1996 | Moffre et al. | 119/784 |
| 5,551,379 | 9/1996 | Hart | 119/771 |

*Primary Examiner*—Michael J. Carone
*Assistant Examiner*—Yvonne Abbott

[57] ABSTRACT

A leash attachment for a truckbed including a primary chain extending between opposed side walls of a truckbed. The primary chain has a first end swively secured to one of the side walls extending horizontally through a stake hole thereof. The primary chain has a second end swively secured to the side wall opposed from the first end extending through a stake hole thereof. At least one secondary chain is removably coupled with a central link of the primary chain. The secondary chain is coupleable to a collar of a dog.

1 Claim, 2 Drawing Sheets

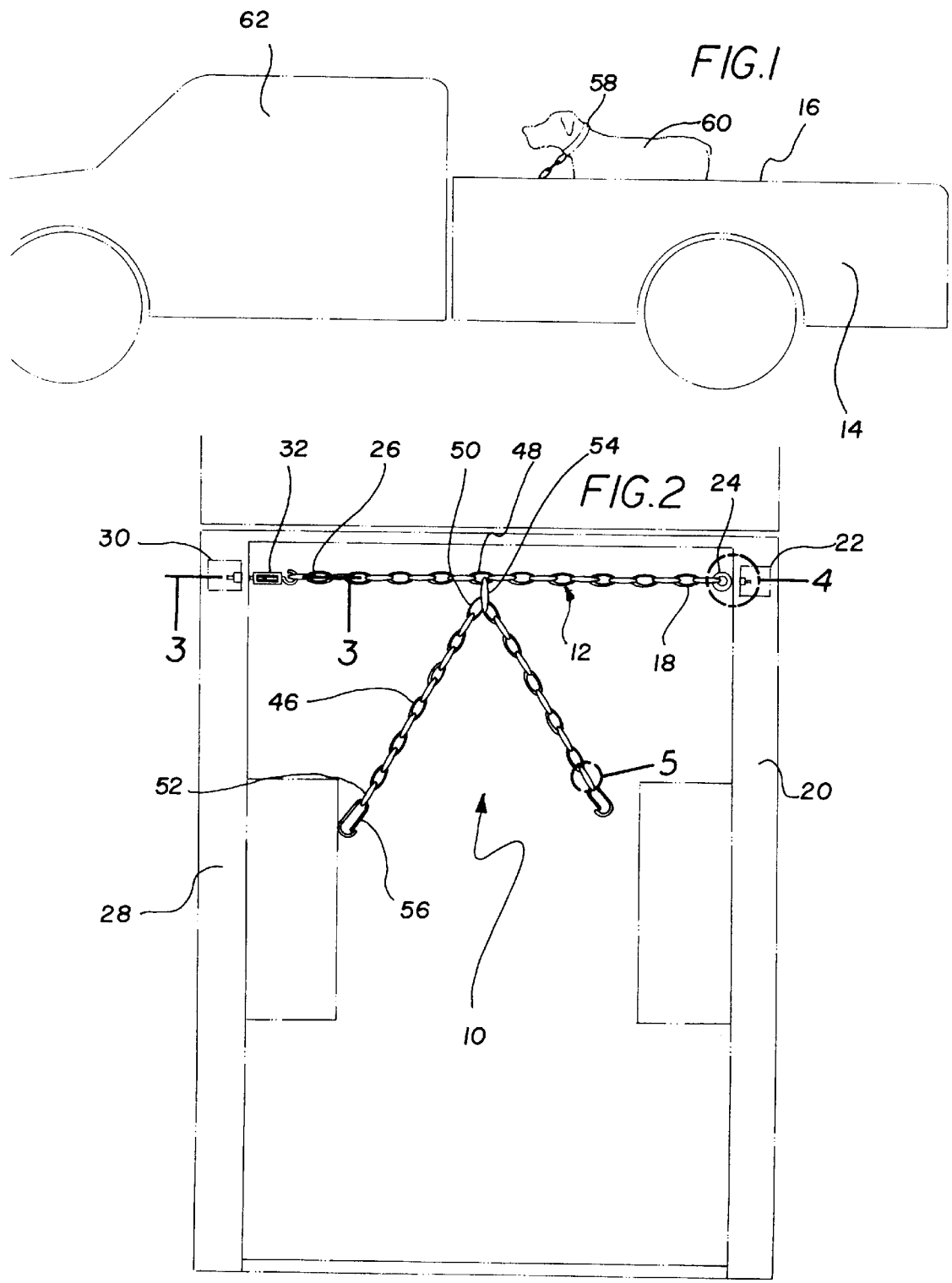

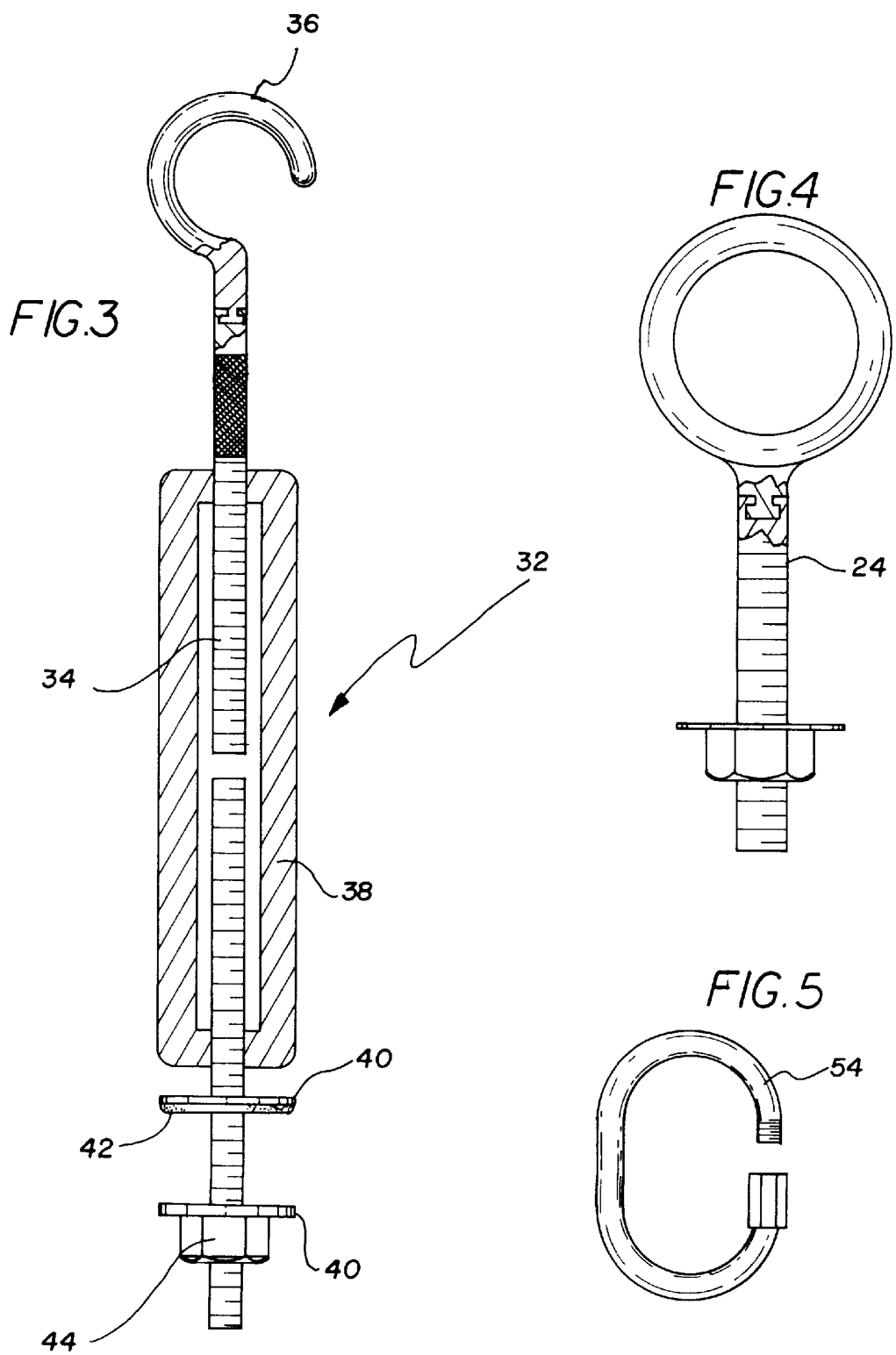

LEASH ATTACHMENT FOR A TRUCKBED

BACKGROUND OF THE INVENTION

1. Field of the Invention

The present invention relates to a leash attachment for a truckbed and more particularly pertains to preventing a dog from jumping out of the truckbed with a leash attachment for a truckbed.

2. Description of the Prior Art

The use of safety leashes is known in the prior art. More specifically, safety leashes heretofore devised and utilized for the purpose of anchoring to a vehicle are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,827,876 to Krekelberg discloses a dog leash attachment. U.S. Pat. No. 4,252,084 to Willow discloses a multiple purpose safety leash. U.S. Pat. No. Des. 360,711 to O'Neill discloses the ornamental design for an animal restraint for a pick-up truck body. U.S. Pat. No. Des. 343,032 to Carrero discloses the ornamental design for a dog transport safety rig for pickup trucks. U.S. Pat. No. 4,892,063 to Garrigan discloses a leash for two or more animals. U.S. Pat. No. 4,947,801 to Glass discloses an animal tethering apparatus for use in vehicles.

While these devices fulfill their respective, particular objective and requirements, the aforementioned patents do not describe a leash attachment for a truckbed for preventing a dog from jumping out of the truckbed.

In this respect, the leash attachment for a truckbed according to the present invention substantially departs from the conventional concepts and designs of the prior art, and in doing so provides an apparatus primarily developed for the purpose of preventing a dog from jumping out of the truckbed.

Therefore, it can be appreciated that there exists a continuing need for new and improved leash attachment for a truckbed which can be used for preventing a dog from jumping out of the truckbed. In this regard, the present invention substantially fulfills this need.

SUMMARY OF THE INVENTION

In the view of the foregoing disadvantages inherent in the known types of safety leashes now present in the prior art, the present invention provides an improved leash attachment for a truckbed. As such, the general purpose of the present invention, which will be described subsequently in greater detail, is to provide a new and improved leash attachment for a truckbed and method which has all the advantages of the prior art and none of the disadvantages.

To attain this, the present invention essentially comprises a primary chain extending between opposed side walls of a truckbed. The primary chain has a first end swively secured to one of the side walls extending horizontally through a stake hole thereof. The first end is swively secured to the side wall by a swiveling eye bolt. The primary chain has a second end swively secured to the side wall opposed from the first end extending through a stake hole thereof. The second end is swively secured to the side wall by a turn buckle swivel. The turn buckle swivel comprises an elongated bolt having a hook rotatably disposed on an end thereof. The hook couples with the second end. The elongated bolt has a turn buckle disposed thereon. A pair of washers are positionable on opposing sides of the stake hole. A nut couples with a free end of the elongated bolt. At least one secondary chain is removably coupled with a central link of the primary chain. The secondary chain has a first end and a second end. The first end is coupled with the central link by a quick connect link. The second end has a clip coupled thereto for securing to a collar of a dog.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved leash attachment for a truckbed which has all the advantages of the prior art safety leashes and none of the disadvantages.

It is another object of the present invention to provide a new and improved leash attachment for a truckbed which may be easily and efficiently manufactured and marketed.

It is a further object of the present invention to provide a new and improved leash attachment for a truckbed which is of durable and reliable construction.

An even further object of the present invention is to provide a new and improved leash attachment for a truckbed which is susceptible of a low cost of manufacture with regard to both materials and labor, and which accordingly is then susceptible of low prices of sale to the consuming public, thereby making such a leash attachment for a truckbed economically available to the buying public.

Even still another object of the present invention is to provide a new and improved leash attachment for a truckbed for preventing a dog from jumping out of the truckbed.

Lastly, it is an object of the present invention to provide a new and improved leash attachment for a truckbed including a primary chain extending between opposed side walls of a truckbed. The primary chain has a first end swively secured to one of the side walls extending horizontally through a stake hole thereof. The primary chain has a second end swively secured to the side wall opposed from the first end extending through a stake hole thereof. At least one secondary chain is removably coupled with a central link of the primary chain. The secondary chain is coupleable to a collar of a dog.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side view of the preferred embodiment of the leash attachment for a truckbed constructed in accordance with the principles of the present invention.

FIG. 2 is a top plan view of the present invention within a truckbed.

FIG. 3 is a cross-sectional view as taken along line 3—3 of FIG. 2.

FIG. 4 is an isolated view of the swivel bolt as taken from circle 4 of FIG. 2.

FIG. 5 is an isolated view of the quick link as taken from circle 5 of FIG. 2.

The same reference numerals refer to the same parts through the various figures.

DESCRIPTION OF THE PREFERRED EMBODIMENT

With reference now to the drawings, and in particular, to FIGS. 1 through 5 thereof, the preferred embodiment of the new and improved leash attachment for a truckbed embodying the principles and concepts of the present invention and generally designated by the reference number 10 will be described.

Specifically, it will be noted in the various Figures that the device relates to a leash attachment for a truckbed for preventing a dog from jumping out of the truckbed. In its broadest context, the device consists of a primary chain and at least one secondary chain. Such components are individually configured and correlated with respect to each other so as to attain the desired objective.

The primary chain 12 extends between opposed sidewalls 14 of a truckbed 16. The primary chain 12 has a first end 18 swively secured to one of the side walls 20 extending horizontally through a stake hole 22 thereof. The first end 18 is swively secured to the side wall 20 by a swiveling eye bolt 24. The primary chain 12 has a second end 26 swively secured to the side wall 28 opposed from the first end 18 extending through a stake hole 30 thereof. The second end 26 is swively secured to the side wall 28 by a turn buckle swivel 32. The turn buckle swivel 32 comprises an elongated bolt 34 having a hook 36 rotatably disposed on an end thereof. The hook 36 couples with the second end 26. The elongated bolt 34 has a turn buckle 38 disposed thereon. A pair of washers 40 are positionable on opposing sides of the stake hole 30. The washer 40 positioned on the exterior of the stake hole 30 is provided with a padded washer 42 to prevent scratching of the paint. A nut 44 couples with a free end of the elongated bolt 34.

The secondary chain 46 is removably coupled with a central link 48 of the primary chain 12. The secondary chain 46 has a first end 50 and a second end 52. The first end 50 is coupled with the central link 48 by a quick connect link 54. The second end 52 has a clip 56 coupled thereto for securing to a collar 58 of a dog 60.

The present invention is a restraint system for dogs designed to be used in open pickup truck beds 62. It allows the dog 60 freedom to move from side to side in the truckbed, yet prevents the dog 60 from jumping out or being thrown out under normal driving conditions.

The present invention is comprised of a five foot long primary chain 12 and up to three secondary chains 46 (the system can be used to restrain up to three dogs).

The primary chain 12 is made from heavy-duty ¼" chain with attachment hardware at both ends. This chain 12 is installed from side to side in the truck bed, behind the cab; through and into stake holes 22,30. (Trucks without a hole on the inside of the stake hole frame will require drilling.)

To complete the installation, the owner determines the desired length of the secondary chains 46 and connects them to the center of the primary chain 12 with the provided quick link 54. Any excess length of chain can be removed with a bolt cutter, or left in place to allow the lead to be adjusted for different sized dogs.

A sturdy scissor swivel snap or clip at the end of each secondary chain 46 allows quick yet secure attachment to the dog's collar 58 or chest harness.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A leash attachment for a truckbed for preventing a dog from jumping out of the truckbed comprising, in combination:

a primary chain extendable between opposed side walls of a truckbed, the primary chain having a first end swively securable to one of the side walls extending horizontally through a stake hole thereof, the first end being swively securable to the side wall by a swiveling eye bolt with the swiveling eye bolt including an eye portion pivotally coupled to a threaded portion, the primary chain having a second end swively securable to the side wall opposed from the first end extending through a stake hole thereof, the second end being swively securable to the side wall by a turn buckle swivel including hook pivotally coupled to a first threaded portion which is pivotal with respect to a second threaded portion, the first and second threaded portions of the turn buckle swivel defining an elongated bolt, the hook coupling with the second end, the elongated bolt having a turn buckle disposed thereon, a pair of washers positionable on opposing sides of the stake hole, the one of the pair of washers being positioned on the exterior of the stake hole is provided with a padded washer to prevent scratching of the paint, a nut coupling with a free end of the elongated bolt; and at least one secondary chain removably coupled with a central link of the primary chain, the secondary chain having a first end and a second end, the first end coupled with the central link by a quick connect link which includes a C-shaped member with a threaded sleeve for closing the same, the second end having a clip coupled thereto for securing to a collar of a dog.

* * * * *